United States Patent
Rey et al.

(10) Patent No.: US 8,359,626 B1
(45) Date of Patent: Jan. 22, 2013

(54) APPLICATION DATA TABLE FOR A MULTISERVICE DIGITAL TRANSMISSION SYSTEM

(75) Inventors: Francois Rey, Le Bourget du Lac (FR); Thierry Furet, Rambouillet (FR); Philippe Poulain, Paris (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/786,778

(22) PCT Filed: Sep. 24, 1999

(86) PCT No.: PCT/IB99/01637
§ 371 (c)(1), (2), (4) Date: Mar. 8, 2001

(87) PCT Pub. No.: WO00/19708
PCT Pub. Date: Apr. 6, 2000

(30) Foreign Application Priority Data

Sep. 25, 1998 (EP) .................................. 98402375

(51) Int. Cl.
H04N 7/16 (2011.01)
H04N 5/445 (2011.01)
G06F 3/00 (2006.01)
G06F 13/00 (2006.01)

(52) U.S. Cl. ........ 725/140; 725/135; 725/136; 725/132; 725/152; 725/50; 725/54

(58) Field of Classification Search .................... 725/54, 725/48, 37, 38
See application file for complete search history.

(56) References Cited

U.S. PATENT DOCUMENTS 5,539,920 A * 7/1996 Menand et al. ................ 725/151
5,978,855 A * 11/1999 Metz et al. .................... 709/249
6,035,304 A 3/2000 Machida et al.
6,360,195 B1 * 3/2002 Liao et al. ........................ 703/28

(Continued)

FOREIGN PATENT DOCUMENTS

EP 0 840 194 A2 6/1997
EP 0 854 650 A2 11/1997

(Continued)

OTHER PUBLICATIONS

DVB Document A038, "Specification for Service InformatiOn (SI) in Digital Video Broadcasting (DVB) Systems", dated Mar. 1998, 76 pages.*
ETSI ETF 211 "Digital Video Broadcasting (DVB): Guidelines on implementation and usage of Service Information (SI)", second edition published in Aug. 1997.*

(Continued)

Primary Examiner — Pankaj Kumar
Assistant Examiner — Usha Raman
(74) Attorney, Agent, or Firm — Osha Liang LLP

(57) ABSTRACT

A method of transmission of application data (97) in a digital transport stream characterized in providing an application data table (110) containing information regarding the applications (97) carried in each service (91, 92) within the transport stream. The application data table (110) may conveniently be designated by a fixed PID value and a TID extension value varying in dependence on the bouquet of services chosen. The use of a single application data table to provide information across all services within a bouquet provides a number of advantages, in particular when deciding whether or not to maintain certain applications when switching between services.

30 Claims, 7 Drawing Sheets

U.S. PATENT DOCUMENTS

| | | | |
|---|---|---|---|
| 6,526,508 B2 * | 2/2003 | Akins et al. | 713/168 |
| 7,856,557 B2 * | 12/2010 | Beuque | 713/181 |
| 7,971,224 B2 * | 6/2011 | Maetz et al. | 725/110 |
| 2002/0062484 A1 * | 5/2002 | De Lange et al. | 725/105 |

FOREIGN PATENT DOCUMENTS

| | | |
|---|---|---|
| EP | 0946 019 A1 | 3/1998 |
| HU | 210 644 B | 5/1990 |
| HU | 215 138 B | 10/1994 |
| JP | 10-13811 A | 1/1998 |
| WO | WO 97/24832 | 7/1997 |
| WO | WO 97/46009 | 12/1997 |
| WO | WO 99/15968 | 4/1999 |

OTHER PUBLICATIONS

ETSI XP-002079535, European Telecommunication Standard Paper No. ETS 300 468, entitled "Digital broadcasting systems for television, sound and data services; Specification for Service Information (SI) in Digital Video Broadcasting (DVB) systems", dated Oct. 1995, 61 pages.

Warner ten Kate et al, XP-002094655, Paper entitled "trigg&link A New Dimension in Television Program Making", undated, 15 pages.

Japanese Office Action for Application No. 2005-573083, mailed on May 12, 2009 (8 pages).

* cited by examiner

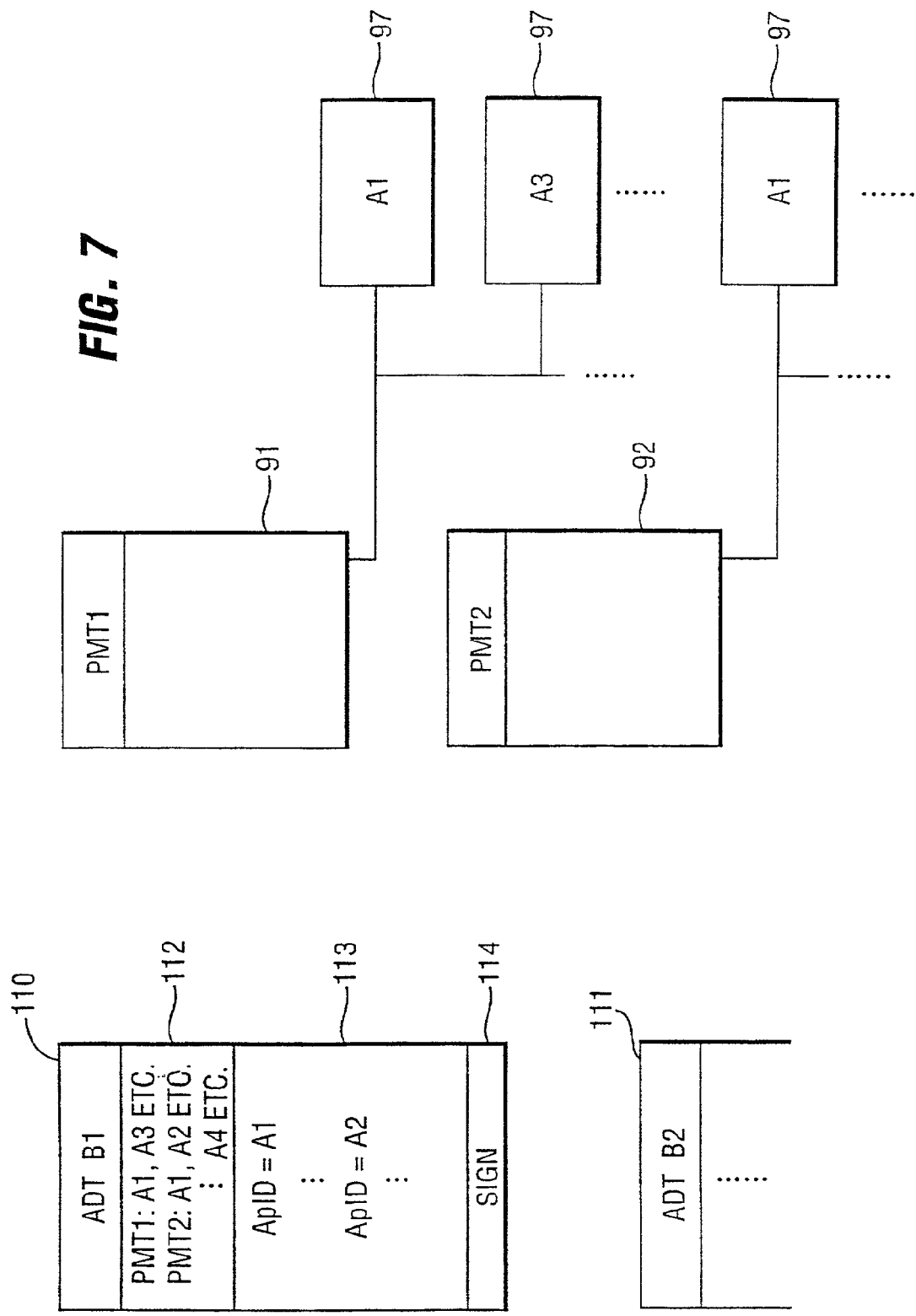

APPLICATION DATA TABLE FOR A MULTISERVICE DIGITAL TRANSMISSION SYSTEM

The present invention relates to a digital transmission system, in particular a digital television system.

Existing digital television systems transmit data in the form of discrete transport stream packets or transport packets, each packet being of a predetermined length and containing a header and a payload. The MPEG-2 standard is the currently favoured standard in this domain and sets out a predetermined format for such packets.

The packet header comprises general descriptive data regarding the packet, whilst the payload comprises the data to be processed at the receiver. The packet header includes at least a packet ID or PID identifying the packet. The payload of the packet may contain audio, video or other data such as conditional access system data or, in particular, application data used by the decoder to set up interactive or other applications. Data within a PID packet may further be divided into a number of tables or sections, identified by a table ID or TID value and, in a yet further precision, a TID extension value.

Data in a conventional transport stream is organised as follows. At the highest level, a programme access table or PAT table lists the PID values of one or more programme map tables or PMT tables, each PMT table being associated with a service within the transport stream. The PMT table in turn refers to the PID values of the packets containing the audio data, video data, application data etc. for that service. As will be understood, whilst a service may be considered as corresponding loosely to a television channel, the concept of a service is somewhat broader, since a service may contain multiple audio and/or visual data streams, only application data etc.

Conventionally, each service operates more or less independently and contains all applications needed by that service. This may include applications specifically linked to the programme being broadcast on that service (for example, a football application associated with a match shown on that channel) as well as more general applications, such as start-up applications or the like. The former type of applications may be accessed via only one or a small number of services, whilst the latter may be carried on all services.

Information regarding the applications carried on a service, including the version number of the application, the memory space required by an application etc., is usually included in the PMT table at the entry point of the service.

A particular problem arises with this conventional organisation of data when changing between services. As described above, each service contains all applications required by that service together with a table of information regarding these applications. Upon selection of a service, a conventionally configured decoder is obliged to download the PMT table and evaluate the content of this table before taking any decision regarding currently running applications. In view of the time normally required to download and analyse a PMT table this may prove a cumbersome operation. Furthermore, the flexibility of operation of the decoder is considerably limited with regard to evaluation of application priority etc.

It is an object of the present invention, in its broadest and/or specific realisations, to provide a solution to this problem.

According to the present invention, there is provided a method of transmission of application data in a plurality of services in a digital transport stream, each of said plurality of services carrying at least one application, the method comprising the step of providing an application data table containing information regarding said at least one application carried by each of a plurality of the services within the transport stream.

In other words, the present invention provides a method of transmission of application data in a plurality of services in a digital transport stream characterised in providing an application data table containing information regarding the application or applications carried by each of a plurality of services within the transport stream.

The use of a single table, the application data table or "ADT", containing information regarding application data across a plurality of services enables a decoder to define its operation in relation to such applications according to a number of different factors.

For example, in the case of an application uniquely carried by one service, a decoder may decide, based on the information regarding this application contained in the application data table to maintain the application even when switching to a service not containing this application. The sort of information that may be used in such an evaluation will be described in more detail below.

The application data table may be advantageously transported in a transport packet having a predetermined packet ID, or PID, value associated with the presence of an application data table within the packet.

Use of a fixed value PID table to carry the data enables all decoders to be pre-programmed to quickly locate and download this table, before accessing any service. As will be understood, the application data table may nevertheless be communicated to or introduced in the decoder by other means, for example, via a modem link, smart card etc. Similarly, the ADT table may also be accessed by PID references in other tables, such as the PMT tables of the services in question.

Typically, one commercial operator is usually responsible for the content of a plurality of service channels, these channels being grouped together as a bouquet of services. A given transport stream often contains a number of bouquets of services each managed by a different operator. Whilst each operator is fully informed of the applications provided over the services within his bouquet, this information is for obvious reasons not usually available to other operators.

Preferably, therefore, the method may further comprise providing a plurality of application data tables, each application data table containing information regarding applications contained within a bouquet of services.

In an alternative realisation, the creation of a "super" ADT table providing information on applications across a number of bouquets may be envisaged. However, in view of the problems in communicating information between operators, this solution may be difficult to put into practice.

In the embodiment using a number of application data tables, each application data table may be conveniently transported in a table or section within a transport packet, each application data table being associated with a table or section having a characteristic table ID or, preferably, table ID extension value.

In the case where a number of ADT tables are carried within the transport stream this provides a particularly convenient way for a decoder to identify the ADT table associated with the bouquet of services to which the user is subscribed. The TID extension value may be contained, for example, in the information communicated to the decoder by the subscription card associated with the bouquet in question. Alternatively, the decoder may maintain a table of TID extension values associated with the various bouquet of services that may be received by the decoder.

In a preferred optional embodiment, the or each application data table is electronically signed so as to permit a decoder to verify an application data table as originating from a known operator. Authentification or signature of data in this manner can be carried out by any known method, for example, by a combined hash and public key/private key algorithm to provide an electronic signature.

In a further preferred embodiment, each service further comprises a programme map table or PMT table giving access to applications carried by this service, the programme map table itself comprising information regarding the or each application carried by this service.

For example, in an embodiment where data for an application is carried within a data carousel accessed via a service, the PMT may include information regarding the carousel address of modules of the application.

In a particularly preferred embodiment, the application data table further comprises information regarding which applications may be carried in each service, for example in the form of a list of services with the applications that may be accessed at any time via each service. This list will normally be dynamic and will change according to the applications currently referred to by a service.

In one embodiment, the application information carried in the application data table further includes information relating to the size of memory required to execute an application.

Additional information may include a priority value indicating the relative priority of an application, a service exclusive value indicating that an application is exclusive to one or more services, a flag value concerning the action to be taken with an application upon a change of service, a data carousel ID value association with the application etc. For further information regarding data that may be carried in the ADT table, the reader is referred to the description of the preferred embodiment.

As will be understood, this list is by no means exhaustive and any number of other factors may be used as well as or instead of those listed.

Preferably, the digital transmission system comprises a digital television system, in particular adapted to function according to the MPEG standard.

The invention has been described above in relation to a method of transmission of digital data. The invention further extends to transmission apparatus for use in a method as aforementioned, said apparatus comprising means, such as a transmitter, for transmitting a transport stream comprising a plurality of services together with an application data table containing information regarding applications carried by a plurality of the services within the transport stream.

The transmitting means may be adapted to transmit the application data table in a transport packet having a predetermined packet ID value associated with the presence of an application data table within the packet.

The apparatus may comprise means, such as a ciphering unit, for electronically signing said application data table so as to permit a decoder to verify an application data table as originating from a known operator.

The transmitting means may be adapted to transmit for each service a programme map table giving access to applications carried by that service, the programme map table itself comprising information regarding said at least one application carried by this service.

The invention further extends to a decoder for use in a method as aforementioned, said decoder comprising a memory for storing an application data table comprising information regarding applications carried by a plurality of services within the transport stream, and means, such as a controller, for controlling at least one of the downloading and maintenance of such applications in dependence on the information contained within the application data table.

The invention also extends to a decoder comprising a memory for storing an application data table comprising information regarding applications carried by a plurality of services within the transport stream, and means for controlling at least one of the downloading and maintenance of such applications in dependence on the information contained within the application data table. Thus, the application data table may be resident in the memory of the decoder without having being broadcast in a transport stream to the decoder by a transmitter.

The invention also provides an application data table containing information regarding at least one application carried by each of a plurality of services within a transport stream.

Features described above relating to method aspects of the present invention can also be applied to device aspects, and vice versa.

As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia interne applications, to a closed circuit television system, and so on.

As used herein, the term "digital television system" includes for example any satellite, terrestrial, cable or other system.

The term "receiver/decoder" or "decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", a decoder functioning in combination with a physically separate receiver, a decoder including additional functions, such as a web browser, or a decoder integrated with other devices such as a video recorder or a television.

Various functions of the receiver/decoder may be implemented in hardware, for example in a dedicated integrated circuit; this may provide enhanced speed of operation. Preferably, however, at least some of the functions are implemented in software, preferably implemented by processing means which runs the applications; this can allow greater flexibility, require less components, and allow the receiver/decoder to be updated more readily.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

There will now be described, by way of example only, a preferred embodiment of the invention, with reference to the following figures, in which:

FIG. 7 shows the use of an application description table in relation to applications provided in a bouquet of services.

Figure 1:
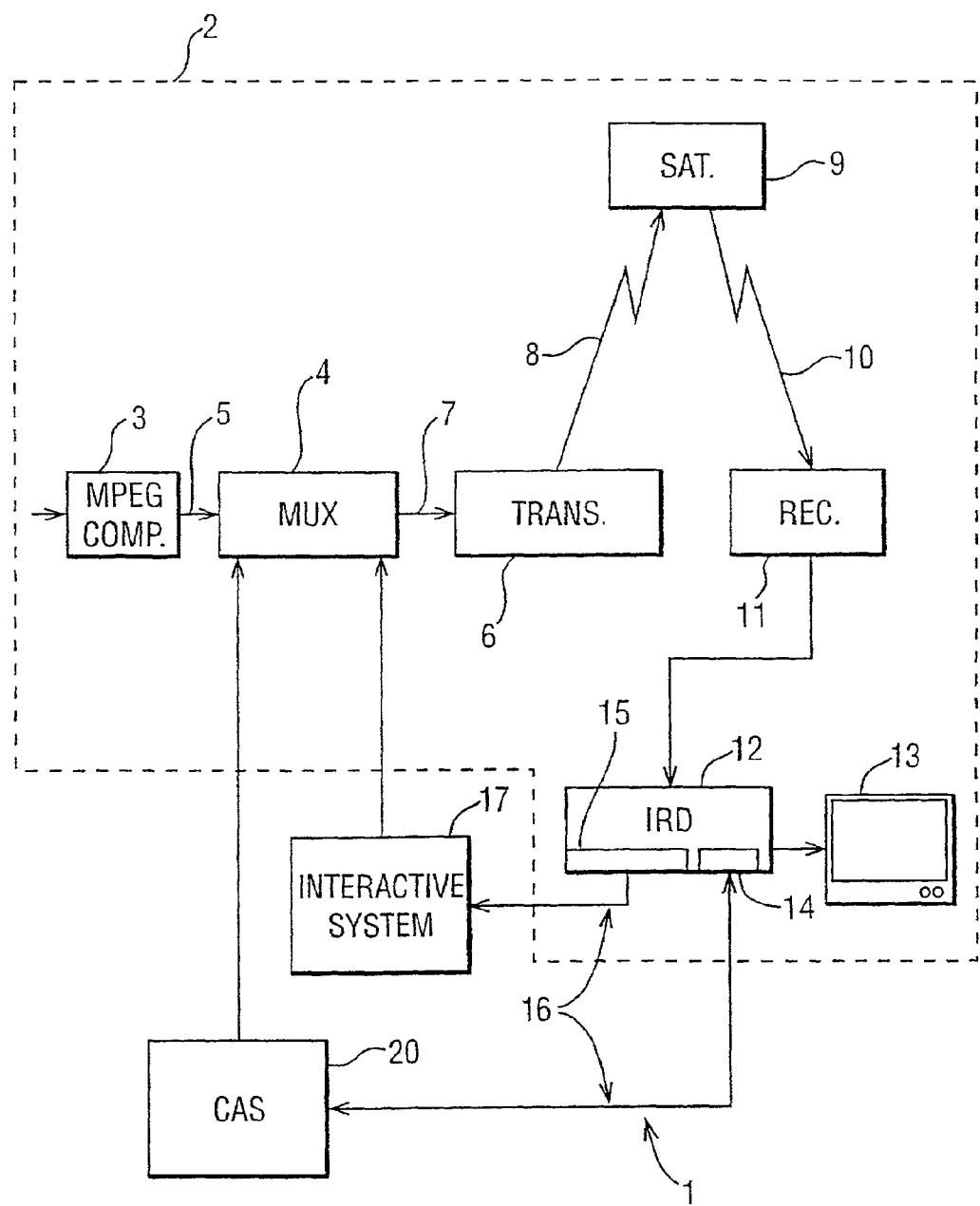
FIG. 1 shows the overall architecture of a digital TV system according to this embodiment.

An overview of a digital television broadcast and reception system 1 is shown in FIG. 1. The invention includes a mostly conventional digital television system 2 which uses the MPEG-2 compression system to transmit compressed digital signals. In more detail, MPEG-2 compressor 3 in a broadcast centre receives a digital signal stream (for example a stream of audio or video signals). The compressor 3 is connected to a multiplexer and scrambler 4 by linkage 5. The multiplexer 4 receives a plurality of further input signals, assembles one or more transport streams and transmits compressed digital signals to a transmitter 6 of the broadcast centre via linkage 7, which can of course take a wide variety of forms including telecom links.

The transmitter 6 transmits electromagnetic signals via uplink 8 towards a satellite transponder 9, where they are electronically processed and broadcast via a notional downlink 10 to earth receiver 11, conventionally in the form of a dish owned or rented by the end user. The signals received by receiver 11 are transmitted to an integrated receiver/decoder 12 owned or rented by the end user and connected to the end user's television set 13. The receiver/decoder 12 decodes the compressed MPEG-2 signal into a television signal for the television set 13.

A conditional access system 20 is connected to the multiplexer 4 and the receiver/decoder 12, and is located partly in the broadcast centre and partly in the decoder. It enables the end user to access digital television broadcasts from one or more broadcast suppliers. A smartcard, capable of decrypting messages relating to commercial offers (that is, one or several television programmes sold by the broadcast supplier), can be inserted into the receiver/decoder 12. Using the decoder 12 and smartcard, the end user may purchase events in either a subscription mode or a pay-per-view mode.

An interactive system 17, also connected to the multiplexer 4 and the receiver/decoder 12 and again located partly in the broadcast centre and partly in the decoder, may be provided to enable the end user to interact with various applications via a modemmed back channel 16.

The conditional access system 20 will now be described in more detail.

Figure 2:
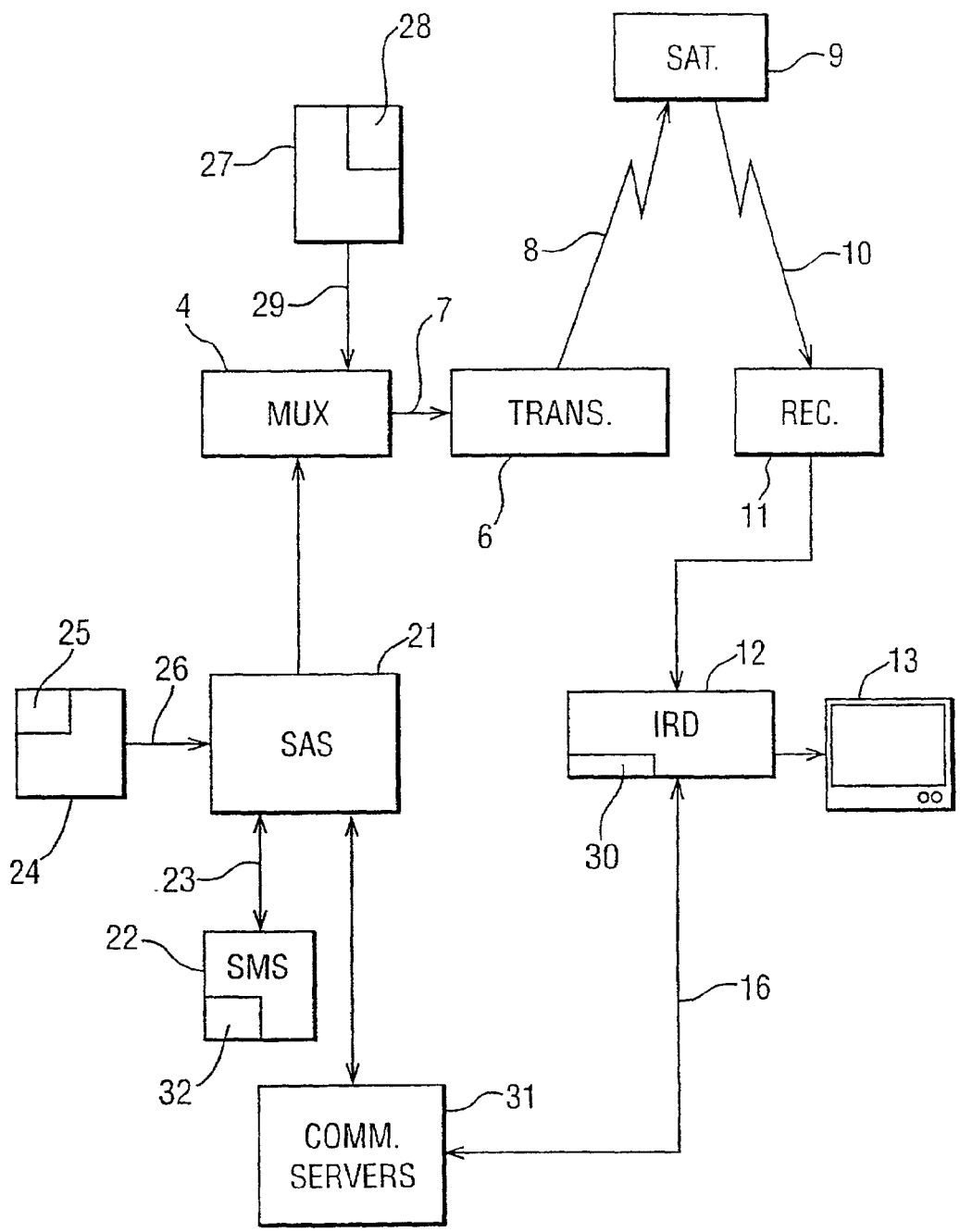
FIG. 2 shows the architecture of the conditional access system of FIG. 1.

With reference to FIG. 2, in overview the conditional access system 20 includes a Subscriber Authorization System (SAS) 21. The SAS 21 is connected to one or more Subscriber Management Systems (SMS) 22, one SMS for each broadcast supplier, by a respective TCP-IP linkage 23 (although other types of linkage could alternatively be used). Alternatively, one SMS could be shared between two broadcast suppliers, or one supplier could use two SMSs, and so on.

First encrypting units in the form of ciphering units 24 utilising "mother" smartcards 25 are connected to the SAS by linkage 26. Second encrypting units again in the form of ciphering units 27 utilising mother smartcards 28 are connected to the multiplexer 4 by linkage 29. The receiver/decoder 12 receives a "daughter" smartcard 30. It is connected directly to the SAS 21 by Communications Servers 31 via the modemmed back channel 16. The SAS sends, amongst other things, subscription rights to the daughter smartcard on request.

The smartcards contain the secrets of one or more commercial operators. The "mother" smartcard encrypts different kinds of messages and the "daughter" smartcards decrypt the messages, if they have the rights to do so.

The first and second ciphering units 24 and 27 comprise a rack, an electronic VME card with software stored on an EEPROM, up to 20 electronic cards and one smartcard 25 and 28 respectively, for each electronic card, one card 28 for encrypting the ECMs and one card 25 for encrypting the EMMs.

The operation of the conditional access system 20 of the digital television system will now be described in more detail with reference to the various components of the television system 2 and the conditional access system 20.

Multiplexer and Scrambler

With reference to FIGS. 1 and 2, in the broadcast centre, the digital audio or video signal is first compressed (or bit rate reduced), using the MPEG-2 compressor 3. This compressed signal is then transmitted to the multiplexer and scrambler 4 via the linkage 5 in order to be multiplexed with other data, such as other compressed data.

The scrambler generates a control word used in the scrambling process and included in the MPEG-2 stream in the multiplexer. The control word is generated internally and enables the end user's integrated receiver/decoder 12 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the preferred embodiment, up to 960 commercial offers may be selected from a bouquet of channels.

In the Pay Per View mode, the end user is provided with the capability to purchase events as he wishes. This can be achieved by either pre-booking the event in advance ("pre-book mode"), or by purchasing the event as soon as it is broadcast ("impulse mode"). In the preferred embodiment, all users are subscribers, whether or not they watch in subscription or PPV mode, but of course PPV viewers need not necessarily be subscribers.

Entitlement Control Messages (ECMs)

Both the control word and the access criteria are used to build an Entitlement Control Message (ECM). This is a message sent in relation with a scrambled program; the message contains a control word (which allows for the descrambling of the program) and the access criteria of the broadcast program. The access criteria and control word are transmitted to the second encrypting unit 27 via the linkage 29. In this unit, an ECM is generated, encrypted and transmitted on to the multiplexer and scrambler 4. During a broadcast transmission, the control word typically changes every few seconds, and so ECMs are also periodically transmitted to enable the changing control word to be descrambled. For redundancy purposes, each ECM typically includes two control words; the present control word and the next control word.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast to the transponder 9. In respect of each scrambled component of the service, a separate ECM is required. Alternatively, a single ECM may be required for all of the scrambled components of a service. Multiple ECMs are also generated in the case where multiple conditional access systems control access to the same transmitted program.

Programme Transmission

The multiplexer 4 receives electrical signals comprising encrypted EMMs from the SAS 21, encrypted ECMs from the second encrypting unit 27 and compressed programmes from the compressor 3. The multiplexer 4 scrambles the programmes and sends the scrambled programmes, the encrypted EMMs and the encrypted ECMs to a transmitter 6 of the broadcast centre via the linkage 7. The transmitter 6 transmits electromagnetic signals towards the satellite transponder 9 via uplink 8.

Programme Reception

The satellite transponder 9 receives and processes the electromagnetic signals transmitted by the transmitter 6 and transmits the signals on to the earth receiver 11, conventionally in the form of a dish owned or rented by the end user, via downlink 10. The signals received by receiver 11 are transmitted to the integrated receiver/decoder 12 owned or rented by the end user and connected to the end user's television set 13. The receiver/decoder 12 demultiplexes the signals to obtain scrambled programmes with encrypted EMMs and encrypted ECMs.

If the programme is not scrambled, that is, no ECM has been transmitted with the MPEG-2 stream, the receiver/decoder 12 decompresses the data and transforms the signal into a video signal for transmission to television set 13.

If the programme is scrambled, the receiver/decoder 12 extracts the corresponding ECM from the MPEG-2 stream and passes the ECM to the "daughter" smartcard 30 of the end user. This slots into a housing in the receiver/decoder 12. The daughter smartcard 30 controls whether the end user has the right to decrypt the ECM and to access the programme. If not, a negative status is passed to the receiver/decoder 12 to indicate that the programme cannot be descrambled. If the end user does have the rights, the ECM is decrypted and the control word extracted. The decoder 12 can then descramble the programme using this control word. The MPEG-2 stream is decompressed and translated into a video signal for onward transmission to television set 13.

Entitlement Management Messages (EMMs)

The EMM is a message dedicated to an individual end user (subscriber), or a group of end users. Each group may contain a given number of end users. This organisation as a group aims at optimising the bandwidth; that is, access to one group can permit the reaching of a great number of end users.

Various specific types of EMM can be used. Individual EMMs are dedicated to individual subscribers, and are typically used in the provision of Pay Per View services; these contain the group identifier and the position of the subscriber in that group.

Group subscription EMMs are dedicated to groups of, say, 256 individual users, and are typically used in the administration of some subscription services. This EMM has a group identifier and a subscribers' group bitmap.

Audience EMMs are dedicated to entire audiences, and might for example be used by a particular operator to provide certain free services. An "audience" is the totality of subscribers having smartcards which bear the same conditional access system identifier (CA ID). Finally, a "unique" EMM is addressed to the unique identifier of the smartcard.

Subscriber Management System (SMS)

A Subscriber Management System (SMS) 22 includes a database 32 which manages, amongst others, all of the end user files, commercial offers, subscriptions, PPV details, and data regarding end user consumption and authorization. The SMS may be physically remote from the SAS.

Each SMS 22 transmits messages to the SAS 21 via respective linkage 23 which imply modifications to or creations of Entitlement Management Messages (EMMs) to be transmitted to end users.

The SMS 22 also transmits messages to the SAS 21 which imply no modifications or creations of EMMs but imply only a change in an end user's state (relating to the authorization granted to the end user when ordering products or to the amount that the end user will be charged).

The SAS 21 sends messages (typically requesting information such as call-back information or billing information) to the SMS 22, so that it will be apparent that communication between the two is two-way.

Subscriber Authorization System (SAS)

The messages generated by the SMS 22 are passed via linkage 23 to the Subscriber Authorization System (SAS) 21, which in turn generates messages acknowledging receipt of the messages generated by the SMS 21 and passes these acknowledgements to the SMS 22.

In overview the SAS comprises a Subscription Chain area to give rights for subscription mode and to renew the rights automatically each month, a Pay Per View Chain area to give rights for PPV events, and an EMM Injector for passing EMMs created by the Subscription and PPV chain areas to the multiplexer and scrambler 4, and hence to feed the MPEG stream with EMMs. If other rights are to be granted, such as Pay Per File (PPF) rights in the case of downloading computer software to a user's Personal Computer, other similar areas are also provided.

One function of the SAS 21 is to manage the access rights to television programmes, available as commercial offers in subscription mode or sold as PPV events according. to different modes of commercialisation (pre-book mode, impulse mode). The SAS 21, according to those rights and to information received from the SMS 22, generates EMMs for the subscriber.

The EMMs are passed to the Ciphering Unit (CU) 24 for ciphering with respect to the management and exploitation keys. The CU completes the signature on the EMM and passes the EMM back to a Message Generator (MG) in the SAS 21, where a header is added. The EMMs are passed to a Message Emitter (ME) as complete EMMs. The Message Generator determines the broadcast start and stop time and the rate of emission of the EMMs, and passes these as appropriate directions along with the EMMs to the Message Emitter. The MG only generates a given EMM once; it is the ME which performs cyclic transmission of the EMMs.

On generation of an EMM, the MG assigns a unique identifier to the EMM. When the MG passes the EMM to the ME, it also passes the EMM ID. This enables identification of a particular EMM at both the MG and the ME.

In systems such as simulcrypt which are adapted to handle multiple conditional access systems e.g. associated with multiple operators, EMM streams associated with each conditional access system are generated separately and multiplexed together by the multiplexer 4 prior to transmission.

Receiver/Decoder

Figure 3:
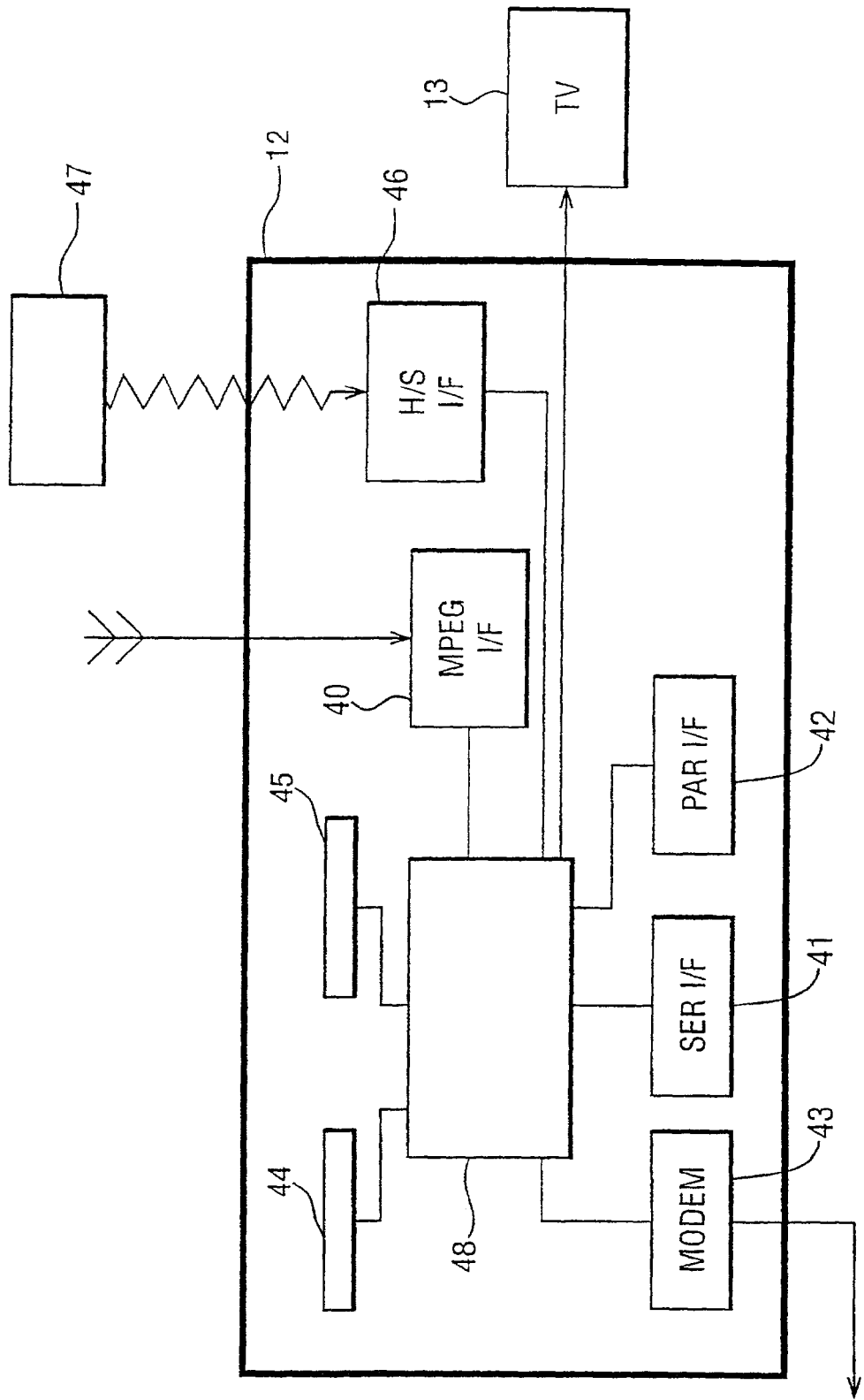
FIG. 3 shows the elements of a receiver/decoder for use in this embodiment.

Referring to FIG. 3, the elements of a receiver/decoder 12 or set-top box for use in a digital broadcast system and adapted to be used in the present invention will now be described. As will be understood, the basic elements of this decoder are largely conventional and their implementation will be within the capabilities of one skilled in the art.

As shown, the decoder 12 is equipped with several interfaces for receiving and transmitting data, in particular a tuner 40 for receiving broadcast MPEG transmissions, a serial interface 41, a parallel interface 42, and a modem 43 for sending and receiving data via the telephone network. The decoder also includes a first and second smart card reader 44 and 45, the first reader 44 for accepting a subscription smart card and the second reader 45 for accepting bank and/or other smart cards.

The decoder also includes a receiver 46 for receiving infrared control signals from a handset remote control 47 and a Peritel output for sending audiovisual signals to a television 13 connected to the decoder.

Processing of digital signals received via the interfaces and generation of output signals is handled by an ensemble of hardware and software elements here grouped together as a central control unit 48.

The software architecture of the control unit within the decoder will be described below in relation to FIGS. 4 and 5. In broad terms, the system uses a virtual machine interacting via an interface layer with a lower level operating system implemented in the hardware components of the decoder. In terms of hardware architecture, the control unit 48 is equipped with a processor, memory elements such as ROM, RAM, FLASH memory etc. as in known decoders.

Applications processed by the control unit 48 may be resident applications stored in the ROM or FLASH of the decoder or applications broadcast and downloaded via the MPEG interface 2 of the decoder. Applications can include program guide applications, games, interactive services, teleshopping applications, as well as initiating applications to enable the decoder to be immediately operational upon start-up and applications for configuring aspects of the decoder. Applications are stored in memory locations in the decoder and represented as resource files comprising graphic object descriptions files, unit files, variables block files, instruction sequence files, applications files, data files etc.

Decoder System Architecture

Figure 4:
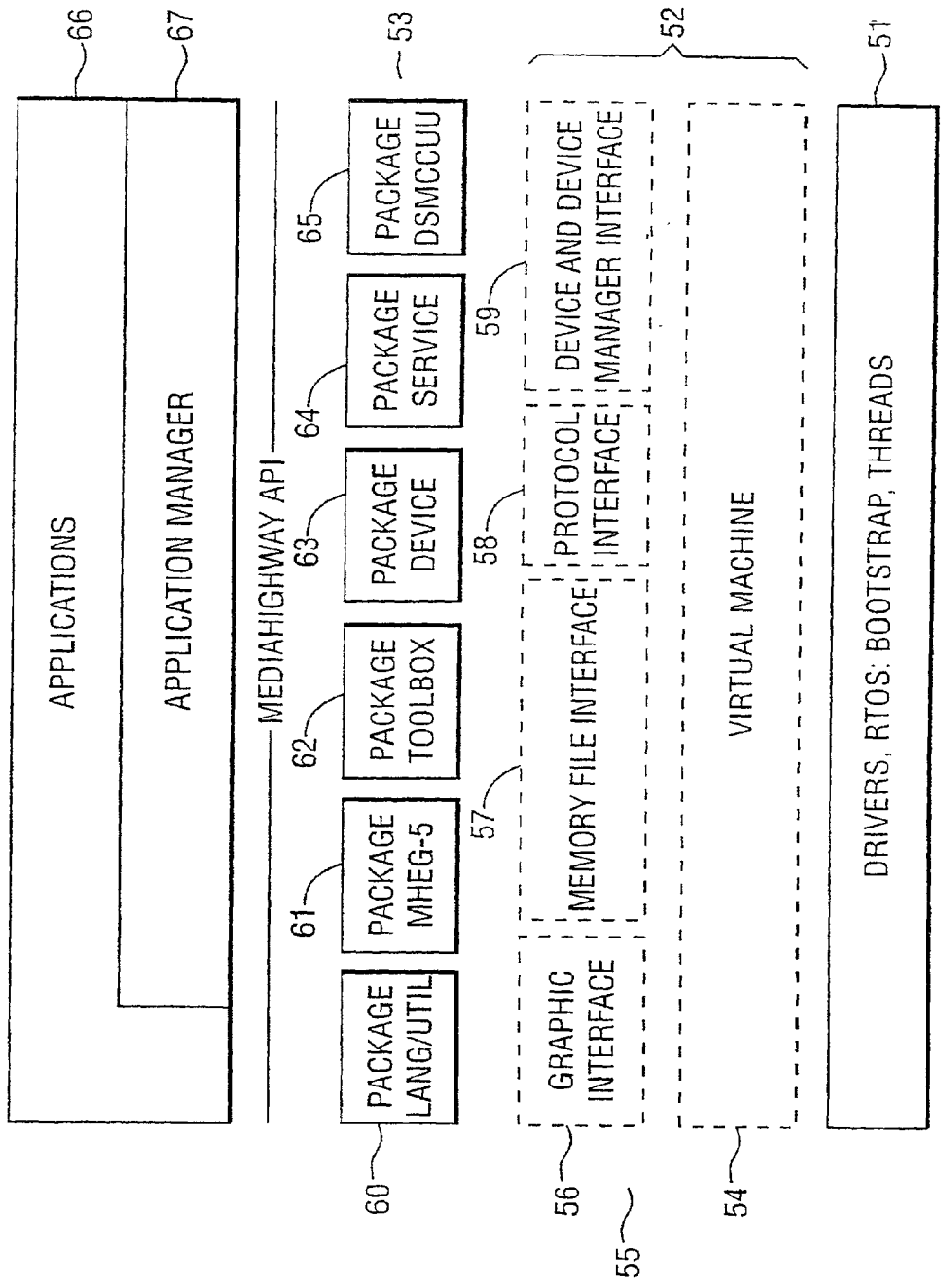
FIG. 4 shows the software architecture of the decoder used in this embodiment.

Turning now to the software architecture of the system within the receiver/decoder as shown in FIG. 4, it will be seen that a layered architecture is used. The first layer 51 represents the operating system of the hardware of the receiver/decoder. This is a real-time operating system chosen by the manufacturer to control the hardware elements of the receiver/decoder. The real-time operating system has a relatively fast response time in order to be able to correctly synchronise hardware operations. The data processing system sits on top of the hardware operating system and comprises a middleware layer 52 and an application interface layer 53.

Event messages are passed between the operating system layer 51 and the middleware layer 52 immediately above. The middleware layer is written in a language such as C ANSI and comprises the elements of a virtual machine 54 and a number of interfaces 55 including a graphical interface 56, a FLASH/PROM memory interface 57, a protocol interface 58 and a device interface 59.

The use of a virtual machine enables in particular to provide independence between upper level applications 66, 67 described in further detail below and usually provided by the system manager or one or more operators, and a lower level operating system 51, usually implemented by the hardware manufacturer of the decoder.

The interfaces 60 provide the link between operations of the virtual machine and the lower level operating system 51 and also include a number of intermediate level application modules more easily executed at this level.

The application interface (API) layer 53 comprises a number of high level packages 60-65, written in an object-oriented interpretative language, such as Java. These packages provide an interface between the high level applications generally created by the service provider (interactive program guide, teleshopping, internet browser etc) and the virtual machine of the system. Examples of such applications are given below.

The lower level OS is normally embedded in the hardware components of the decoder, although in some realisations, the lower level OS can be downloaded. The middleware and application interface layer packages can be downloaded into the RAM or FLASH memory of the decoder from a broadcast transmission. Alternatively, some or all of the middleware or application interface layer elements can be stored in the ROM or (if present) FLASH memory of the decoder. As will be understood, the physical organisation of the memory elements of the decoder is distinct from the logical organisation of the memory.

Applications and Application Manager

As shown in FIG. 4, a number of high level applications 66 sit on top of and communicate with lower levels in the system via the application interface layer 53. As will be described below, applications may originate from a variety of sources and/or operators. The overall control of such applications will be carried out by an application manager 67, itself installed as an application and responsible for managing the downloading of broadcast applications, the rights of certain applications to address and control lower layers of the system etc.

Application Interface Layer

Referring to the application interface layer 53 shown in FIG. 3, and as described above, the packages in this layer are written in an object oriented language such as Java. Each package defines a set of class libraries called on during operation of the system. In the present system the following packages are installed.

Lang/Util Package 60. These packages define the classes necessary for the manipulation of objects by the virtual machine. These class libraries normally form part of a standard library associated with the object oriented language chosen. MHEG-5 Package 61. This package defines the classes associated with the manipulation of graphical objects on the television display. Such objects are distinct from audio-visual data and can make up, for example, channel identifiers or text laid over displayed images. The definition of classes within this package should respect the MHEG-5 norms defined by the standards ETS 300777-3 and ISO/ISE 13522-5 (and the standard ISO/ISE 13522-6 in the case of a Java implemented system).

Toolbox Package 62. This package contains the classes used for downloading and decompression of information as well as the classes associated with the management of the file system and memory within the receiver/decoder and the classes associated with the connection to the internet etc.

Device Package 63. This package defines the classes necessary for management of peripherals attached to the receiver/decoder, as discussed above and including the modem, the smart card readers, the MPEG flow tuner etc Service Package 64. This package defines the classes necessary for the implementation of developing higher level interactive applications, such as management of credit card data etc.

DSMCC-UU Package 65. This package implements the protocols necessary for communication between a client and a server for data file search and reading. Implementation of this package should respect the norm ISO/IEC 13818-6 and directives defined in DAVIC part 9.

A further layer of interactive applications, written by the service provider and downloaded during broadcast as in conventional systems, will be laid over the interface packages defined above. Depending on the applications to be introduced, some of the above packages may be omitted. For example, if the service provider does not intend to provide a common way for data reading, the DSMCC-UU package may be left out of the final system.

The packages 53 provide class libraries for an object-oriented programming environment. Their class behaviour will depend on the language chosen. In the case of a Java application, for example, a single inheritance class structure will be adhered to.

Interface Layer

As shown, the interface layer is composed of four modules, a graphics module 56, a memory file management module 57, a protocol module 58 and a device manager 59. Whilst the modules at this level are described as interface modules their function is to provide a "glue" layer for the implementation of the application interface packages and for the operation of the virtual machine generally.

The graphics module 56, for example, provides the creation and management of graphical objects. It asks the low level OS to display basic graphic shapes such as single pixels, lines, rectangles etc. The implementation of this module depends on the graphics capability of the low level manufacturer's OS. In some ways complementary to the MHEG-5 package 4311, these functions may be more efficiently executed at this code level than in the high level code chosen for the application layer above.

In a similar manner, the memory file management module 57 includes low level read/write file commands associated with the memory components of the system. Typically, the hardware operating system only includes commands necessary to read/write a sector or page within a memory component. As with the graphics module 56, this module enables a set of simpler lower level applications to be efficiently introduced in the system.

The protocol management module 58 defines a library of communication protocols that may be called upon in communications via, for example, the TCP/IP layer of the decoder.

The device manager 59 is slightly different from the other modules in this layer in that it provides the link or interface between the hardware operating system and the layers above, including the other modules in the interface layer and the virtual machine. Commands or event messages that are received/sent to the hardware OS from the virtual machine, for example, are necessarily passed by the device manager for conversion according to the interface specifications between the two levels.

Virtual Machine Description

Figure 5:
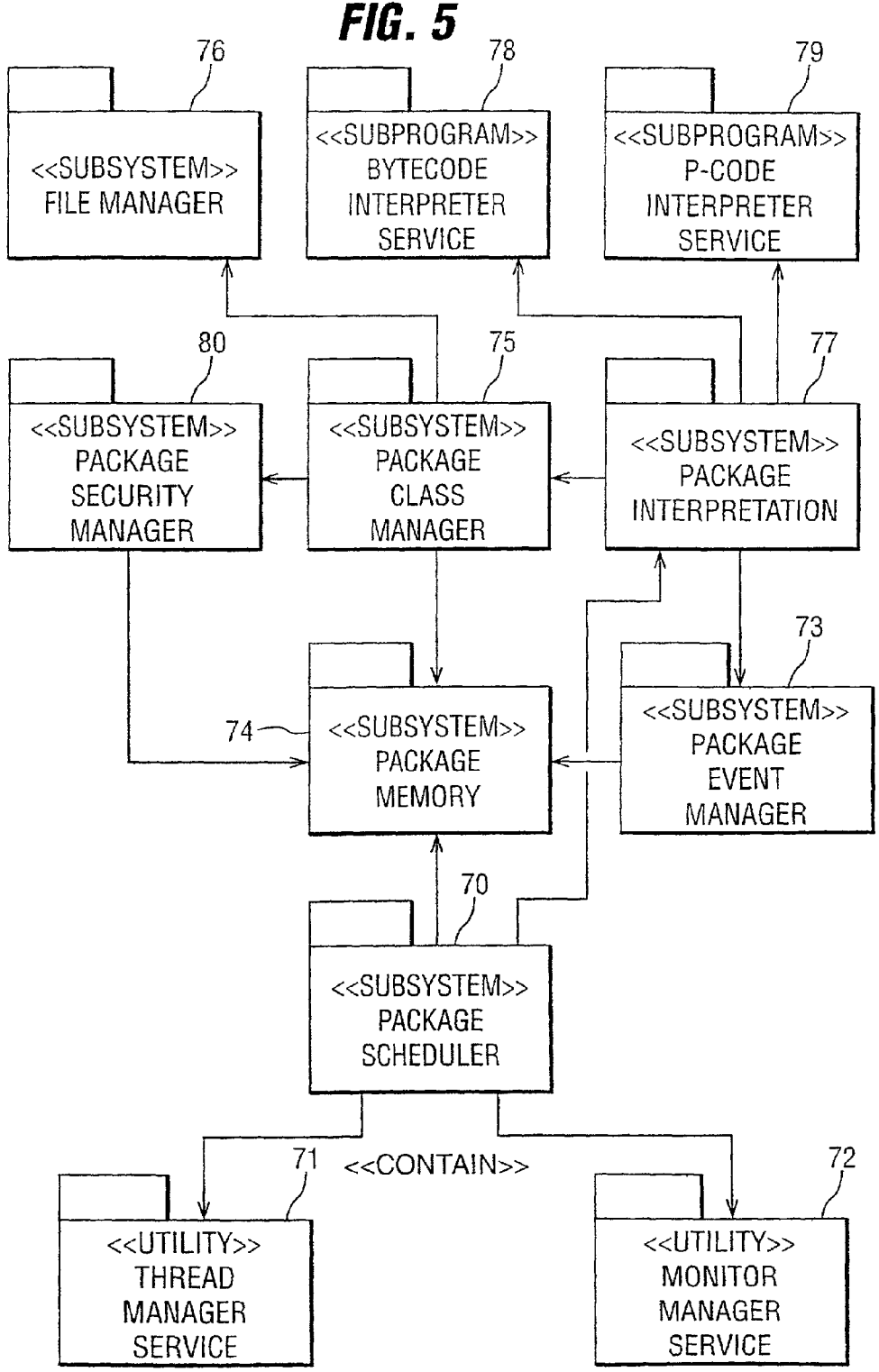
FIG. 5 shows the architecture of the virtual machine within the system of FIG. 4.

Referring now to FIG. 5, the structure of the virtual machine 54 used in the system of the present invention will be described. The virtual machine used in the present invention is a pre-emptive multithread type machine. The general characteristics of such a machine are known in other contexts outside of the audio-visual and digital television fields and the following description will focus on those areas that are the most specific to the present application.

The virtual machine is composed of a number of elements, which interact broadly as shown in FIG. 5.

The scheduler 70 composed of a thread manager service 71 and a monitor manager service 72 forms the heart of the multithread machine. The scheduler 70 orders the execution of threads created by applications externally of the virtual machine and those created by the virtual machine itself (e.g. a garbage collection thread).

The event manager 73 handles an event routing table and the lists of events subscribed to by the threads and centralises the dispatch of event treatments.

The memory manager 74 handles the allocation and disallocation of the memory zones within the system memory and also handles the removal from the memory of non-referenced objects (garbage collection).

The class manager 75 charges the classes of the application code downloaded in a broadcast signal, interacting with the security manager 80 to check the integrity of downloaded code and with the file manager 76, which implements the applications.

The file manager 76 carries out the implementation of the system files and the handles the mechanism of downloading of interactive applications and data.

The security manager 80 handles the level of access permitted to downloaded applications, some applications having the ability to carry out more operations than others in relation to the file system.

The interpreter 77 comprising a bytecode interpretation service 78 and a "m-code" interpretation service 79 handles the interpretation of applications written in these two codes, bytecode being associated with Java applications and m-code being the name given to a proprietary code developed by the applicants.

As set out above, the decoder is adapted to implement and execute applications downloaded in transport packets and data tables from the transport stream broadcast by the satellite, cable or terrestrial system. There will now be described, with reference to FIG. 6, the organisation of these and other such data tables within a conventional MPEG-2 datastream.

Organisation of Data Tables within the Transport Stream

Figure 6:
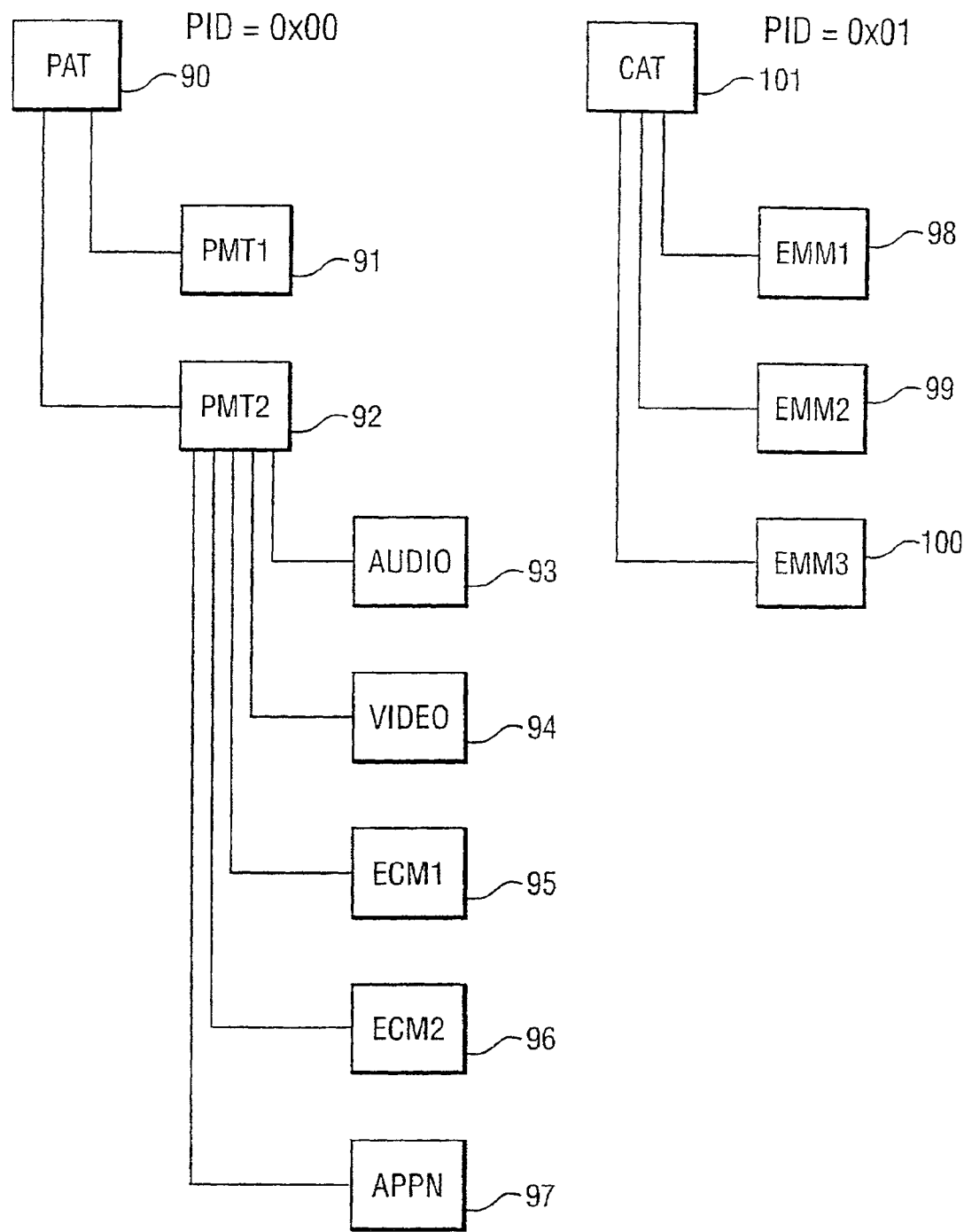
FIG. 6 shows the hierarchy of packets for various services in the transmission transport stream.

As shown in FIG. 6, the broadcast data transport stream contains a number of packets of standard format, including a programme association table 90 ("PAT"), the PID in the header of the packet being fixed by the MPEG-2 standard for this packet at a value of 0x00. The programme access table 90 provides the entry point for access to programme data and contains a table referring to the PID values of the programme map tables ("PMT") 91, 92 associated with a given service or channel within the stream. Each programme map table 91, 92 contains in turn a reference to the PID values of the packet streams of the audio tables 93 and video tables 94 associated with that service.

As shown, the programme map table 92 also contains references to the PID values of other packets 95, 96, 97 containing additional data relating to the service in question, in particular, ECM data generated by a number of conditional access systems and associated with the service in question as well as application data carried by this service.

In addition to the programme access table PAT 90, the MPEG transport stream further comprises a conditional access table 101 ("CAT"), the PID value of which is fixed at 0x01. Any packet headers containing this PID value are thus automatically identified as containing access control information. The CAT table 97 refers to the PID values of MPEG packets 98, 99, 100 referring to EMM data associated with one or more conditional access systems. As with the PMT packets, the PID values of the EMM packets referred to in the CAT table 101 are not fixed and may be determined at the choice of the system operator.

The MPEG-2 standard specifies very few fixed PID values outside of the PAT table value and the CAT table value referred to above. The majority of PID values within a certain range may therefore be determined by an operator. As will be described in greater detail below, the present embodiment of the invention proposes a fixed PID value to be assigned to a table containing data relating to applications carried in a number of services and bouquets.

Format of Transport Packets and Private Section Data

As is known, MPEG transport packets are of a fixed length of 188 bytes including a header. In a standard packet, the three bytes of the header following the synchronisation data comprise:

TABLE I

| Transport error indicator | 1 bit |
| Payload unit indicator | 1 bit |
| Transport priority | 1 bit |
| PID | 13 bits |
| Transport scrambling control | 2 bits |
| Adaptation field control | 2 bits |
| Continuity counter | 4 bits |

The characteristics of these fields are largely determined by the MPEG standard.

The above describes the format of the header of a transport packet. In conformity with the MPEG-2 standard, information contained with a packet payload is subject to a further level of structure according to the type of data being transported. In the case of audio, visual, teletext, subtitle or other such rapidly evolving and synchronised data, the information is assembled in the form of what is known as a packetised elementary stream or PES. This data stream, which is formed by assembling the payloads of the transmitted packets, itself comprises a sequence of packets, each packet comprising a packet header and payload. Unlike the transmitted packets in the transport stream, the length of PES packets is variable.

In the case of some other types of data, such as application data or ECM and EMM data, a different format from PES packeting is proscribed. In particular, data contained in the transport packet payload is divided into a series of sections or tables, the table or section header including a table ID or TID identifying the table in question. Depending on the size of the data, a section may be contained entirely within a packet payload or may be extended in a series of tables over a number of transport packets. In the MPEG-2 context, the term "table" is often used to refer to a single table of data, whilst "section" usually refers to one of a plurality of tables with the same TID value.

The actual TID values used to refer to information carried in these tables or sections are not fixed by the MPEG-2 standard and may be defined at the discretion of the operator of a service or bouquet of services.

As with transport packet data and PES packet data, the data structure or syntax of a table or section is nevertheless additionally defined by the MPEG-2 standard. Two possible syntax forms for private table or section data are proposed; a long form or a short form.

In both the short and long form, the header of a private table includes at least the data comprising:

TABLE II

| Table id | 8 bits |
| Section syntax indicator | 1 bit |
| Private indicator/reserved | 1 bit |
| ISO reserved | 2 bits |
| Section length | 12 bits |

The private indicator and private section lengths are comprised of data not fixed by the MPEG-2 standard and which may be used by the system operator for his own purposes. For further information regarding table syntax, the reader is referred to the MPEG-2 standard.

Applications accessed via one or more PMT tables

As will be understood from the above, each PMT table defines a particular service or channel and the information available on this service. Within a given service, for example, a plurality of audio and video streams may be carried, for example, to enable a viewer to watch a sporting event broadcast on that service from a number of different angles.

The service may also contain applications downloaded and executed by the decoder, for example, such as an interactive shopping application or an interactive meteorological chart. The number and type of applications carried in the service and accessed via its PMT table can vary greatly. In the case of a dedicated weather channel, for example, the majority of the data carried by the channel may relate to an application executed by the decoder such that there is, for example, no real-time video data carried by this service.

In a bouquet of services, some applications such as a startup application may be carried by all services whilst some applications may be exclusive to one service, for example, an application containing information relating directly to a programme being shown only on that service.

Conventionally, all data regarding the applications carried by a given service is contained in the relevant PMT table for that service. Each PMT table carries information on the complete set of applications used by that service and provides the point of access to these applications.

Upon selection of a service, the application managers of conventional systems execute a predetermined sequence of decisions with regard to the applications carried in the service and, if already tuned to a service, those applications currently running in the decoder. Applications that are not already present in the decoder but which are contained in the new service are downloaded from the service. If a more recent version to that running in the decoder is carried in the service, this is downloaded and the older version deleted. Applications which are running and which are listed in the new service in the same (or an older version) are maintained. Applications that are not listed in the new service but that are currently running are deleted.

This latter operation of the application manager found in conventional decoder systems can in particular lead to a number of problems. In the case, for example, where a user changes from one channel to another and back again, an application may be deleted and then re-installed. As will be understood, installation of an application can take some time depending on the size of the application and the available memory in the decoder.

Furthermore, upon each change of channel, the decoder is required to download and analyse the PMT table data before having sufficient information to carry out any action regarding applications to be downloaded or currently running. This may take some time. As mentioned above, each service is completely independent and includes all applications necessary to the operation of the service and the information regarding such applications is carried in the PMT table of that service.

In such a context, the case of applications currently running in the decoder and that are not listed in the PMT table of the new service poses a problem, since the application manager has no information regarding which of the currently running applications may be maintained with impunity upon changing to this service, and which need to be deleted. Most current systems act simply to delete currently running applications to permit downloading of new applications.

Referring to FIG. 7, there will now be defined a data format for tables and sections in the MPEG transport stream which enables the problems of the known systems to be overcome.
Application Description Table As shown in FIG. 7, the transport stream includes, in addition to the PMT1 and PMT2 tables 91, 92 used to define the data contained in a first and second service, an application description table or tables 110, 111 for each available bouquet of services. ADT B1 designates the table for a first bouquet of services, ADT B2 the table for a second bouquet etc.

In a similar manner to the PAT and CAT tables, the PID value of an ADT table is fixed at a value not presently reserved or prohibited by the MPEG-2 standard. All application description or ADT tables in all service bouquets are referred to by this PID value and, preferably, a fixed TID value. In order to permit different ADT tables for different service bouquets, a specific TID extension value is assigned to each ADT table associated with a bouquet of services. These TID extension values do not need to be fixed and may be decided by common agreement between the operators of each bouquet.

As will be understood, whilst the present embodiment of the invention uses an ADT table per bouquet of services, the concept may be generalised to the use of a single global ADT table covering all services across all bouquets. In view of the differences between operators running each bouquet of services, this may be difficult to implement, since it would imply the creation of a "super operator" charged with compiling information for all operator bouquets and creating the global ADT table.

A decoder is normally configured to receive a bouquet of services in dependence on the rights transmitted by a subscription smart card or PCMCIA card inserted in the decoder. Based on the information received from the subscription card, the application manager within the decoder may then download the ADT table having the appropriate TID extension value associated with this bouquet.

Changing the subscribed bouquet by changing the associated subscription card will cause the decoder to download the ADT table associated with the new bouquet of services and referred to by its own unique TID extension value. The TID extension value may be given directly in the information received from the subscription card, or may be derived from a table in the decoder. Equally, the decoder may be configured to the correct TID extension value by other means, for example, via a modem link.

Alternatively, the decoder may be configured to scan and filter all ADT tables in the transport stream using the fixed PID, TID values. As will be described below, within each ADT table is a reference to the PMT value of the services to which the ADT table applies. From this information, the decoder can deduce which ADT table applies when operating in relation to a particular bouquet of services.

As shown, an ADT table 110 associated with the bouquet of services B1 is divided into three parts; a service description part 112, an application description part 113 and an (optional) signature part 114.

The service description part 112 contains information regarding which applications A1, A2, A3 etc. are carried by each service PMT1, PMT2 etc. in the bouquet of services B1. Each application is identified by a unique application ID (A1, A2 etc.).

In FIG. 7, the service description part 112 identifies the service PMT1 as being associated with the applications A1, A3 etc. and the service PMT2 as being associated with the applications A1, A2, A4 etc.

The application description part 113 of the ADT table contains a description of the applications accessible via all services of the bouquet and links the application ID to data describing the characteristics of this application. The description typically contains the following parameters:

Application_id. The application_id enables identification by the Application Manager of the applications carried in each service of the bouquet. In this embodiment, since a different ADT table is associated with each bouquet, another bouquet of services may refer to its own applications by the same ID values and an application is therefore only uniquely identified by the pair of values (application_id, bouquet_id).

Application_type: The type of the application, for example, a pure Java language application or a MHEG-5 application. This definition of type is necessary because the activation of an application can be completely different depending on its type and since different types of application may be carried in the same bouquet of services. Type can also include the version number of the software.

Application_name: The name of the application as known by or displayed to the user. This is typically the name that the user will see when the application is started. For example, we can imagine writing a message in a window: "launching PILOT" upon activation of an application named "PILOT"

Application_bootinfo: The access point of the application (depending on the application_type) that the application manager has to address in order to download and to launch the application.

Application_flag: This field gives the behaviour of the application concerning downloading, launching, etc. In particular, this field may be used to define whether an application is to be maintained or killed when changing between services in the bouquet, irrespective of any indications in the PMT table of the services in question.

Application_key. The remote control key or other input action associated with activation of the application. For example, in case of a pilot or navigator type application, the application_key may be a button of the remote control associated with the activation of the pilot. For auto-start applications, the application_key value may be a default value.

Application_exclusive. A flag to indicate that an application is exclusive to a service. This enables a list of application_ids exclusive to each service to be assembled by the application manager, the application manager acting to delete an application in the case of changing to another service.

Application_priority. The priority of the application, for example, between min(1) and max(7). In this regard, priority can refer to the priority of access to resources within the decoder and/or priority in terms of downloading of an application. If desired, two separate priority fields may be used to reflect this difference.

Application_memory. The memory size necessary for the application to be downloaded. This corresponds not only the size of the application but to an estimation of the maximum amount of memory that will be used by the application itself and its data.

Application_version. The present version of the application.

DVB triplet. This identifies a list of services, for applications which are specific to a service. The DVT triplet is made-up of an original Network_Id, a TransportStream_Id, and a Service_Id.

As will be appreciated, many types of information may be included and the factors in above list are not intended to be exhaustive and/or obligatory.

Other information in the application description part may include information needed to locate modules of an application contained within a further level of structure in the TID tables of sections of the service. For example, in addition to being packetised in tables and sections for transmission, an application may itself be organised in a data carousel, for example, conforming to the DSMCC data format. The information contained in the ADT can include a path description or carousel address to enable the decoder to go to a specific entry point to download an application.

Finally, the ADT table 110 includes a signature 114 comprising an electronic signature of the data in the ADT table 110 and which enables the decoder to verify the origin and integrity of the data in the table.

This may be created by the operator responsible for the bouquet, for example, using a combination of a hash algorithm (such as MD5) to obtain a hash value corresponding to the data in the table, this hash value then being encrypted by a private key of a public/private algorithm (such as RSA). Verification of the ADT table may be carried out by a decoder possessing the same hash algorithm and supplied with the corresponding public key. The use of a combination of hash and private/public key algorithms to verify communicated data is known and will not be described here in any further detail.

Alternatively or in addition, the ADT table may even be encrypted by a symmetric algorithm. However, as will be understood, use of an electronic signature at this level is optional and, in practice, verification may be carried out at a lower level, for example, on the application data itself.

As described above, the ADT table for a given bouquet will have a predetermined PID and TID extension value and this table will be loaded and verified immediately upon start up of the decoder, regardless of which service channel (if any) the decoder is tuned to. Once supplied with the information in this table, the application manager can then make reasoned choices regarding maintenance or non-maintenance of applications when tuned to or changing between services and without having to wait the downloading of a PMT table.

In particular, upon selection of a service or upon changing services the application manager may take into account information contained in the application_flag, application_exclusive, application_priority and application_memory fields in evaluating which applications to download, which applications to maintain, which applications must be deleted etc.

In the case of a decoder tuned firstly to the service channel PMT1 shown in FIG. 7, the application manager will identify the applications A1, A3 contained within this service channel as being present and valid, that is as applications corresponding to applications listed in the service section 112 of the ADT table of the bouquet. Using the ADT table data for these applications, the application manager then carries out a determination as to whether or not to download the applications and, assuming all conditions are met (sufficient memory etc.) will download applications A1, A3 etc.

If the user now changes to the service channel PMT2, the application manager will identify the applications A1, A2, A4 as being present and valid in this channel.

In the case of the application A1, the application manager will be aware that this application is already downloaded and present in the decoder in its latest version and will normally not carry out any action, leaving A1 running "as is" in the decoder. In the case of the applications A2, A4 the application manager may, for example, evaluate the values application_priority, application_memory etc. of these applications and compare these values with the corresponding values of the application A3 previously downloaded and currently running in the decoder. The evaluation may also be carried out using the value application_flag of the currently running application (see above).

Even though the application A3 is not present and not required for all access to the possibilities provided by the service channel accessed via PMT2, the application manager may nevertheless decide in dependence on the value application_flag to continue to run the application A3 in preference to, or as well as, downloading one or the other of the applications A2, A4. If the user then changes back to PMT1, the application A3 is thus immediately available.

Many other alternatives are possible. For example, the application manager may be configured to kill the application A1 (for example if A1 includes an application_exclusive flag associated with PMT1); to maintain A3 for a limited period of time before killing A3 and downloading A2, A4; to maintain A3 until the user presses a key on the remote control and thereafter kill A3 and download one of the applications A2, A4 etc.

As will be understood, the use of an ADT table containing data over all services in a bouquet enables the application manager of the decoder to carry out an unusually sophisticated evaluation regarding the maintenance or non-maintenance of applications carried in a plurality of service streams.

In the above example, the ADT table has been described as being downloaded from the broadcast transport stream. In practice, the ADT table, or at least a start up version of the ADT table, may be loaded into the decoder at the moment of manufacture of the decoder, so as to enable the decoder to automatically load certain applications carried in some or all services in a bouquet. Alternatively, the decoder may download a version of the ADT table via its modem connection, via the smart card interface, via the serial port etc.

The invention claimed is:

1. A method of transmission of application data in a plurality of services carried in a digital transport stream, each application being carried by one or more of the plurality of, comprising:

provide a single application data table containing information regarding each application carried by one or more of plurality of services, wherein the at least one application is an executable application configured to execute on a decoder, and wherein the single application data table comprises a list of applications carried by each of the plurality of services, and indicates whether a given application is carried by more than one service, wherein the decoder is configured to execute a first set of one or more applications that are carried by a first service after downloading the first set of one or more applications, and wherein, upon receiving from the user an instruction to change from the first service to a second service, the decoder is configured to determine which of the first set of applications is also carried by the second service, wherein the determination is made based on the information in the application data table without obtaining a PMT table for the second service; and wherein, upon determining that at least one or more of the first set of applications is also carried by the second service, the decoder is configured to maintain or delete the one or more applications of the first set of applications that are also carried by the second service during the service change.

2. The method as claimed in claim 1, wherein the single application data table is transported in a transport packet having a predetermined packet ID value associated with the presence of an application data table within the packet.

3. The method as claimed in claim 1, wherein said single application data table is electronically signed so as to permit a decoder to verify the single application data table as originating from a known operator.

4. The method as claimed in claim 1, wherein the digital transport stream comprises, for each of the plurality of services, a program map table providing a point of access to said at least one application carried by this service.

5. The method as claimed in claim 1, further comprising: providing a plurality of said application data tables, each application data table containing information regarding applications contained within a bouquet of services.

6. The method as claimed in claim 1, wherein the digital transport stream conforms to the MPEG standard.

7. The method as claimed in claim 1, wherein said application data table further comprises information linking each application carried by said plurality of services to parameters describing said application.

8. The method as claimed in claim 7, wherein said parameters comprise an application identifier uniquely identifying said each application within the plurality of services.

9. The method as claimed in claim 7, wherein said parameters comprise information defining whether an application is to be maintained or not when changing services.

10. The method as claimed in claim 7, wherein said parameters comprise a priority of an application for accessing resources of the decoder compared to other applications.

11. The method as claimed in claim 7, wherein said parameters comprise a priority of an application for downloading by the decoder.

12. A transmission apparatus comprising:
a transmitter for transmitting a transport stream comprising a plurality of digital television services, wherein each of the plurality of services carries at least one application, together with a single application data table comprising information regarding said at least one application carried by each of a plurality of the services within the transport stream,
wherein the at least one application comprises an executable application configured to be executed on a decoder,
wherein the single application data table further comprises a list of applications carried by each of the plurality of services and indicates whether a given application is carried by more than one service,
wherein the decoder is configured to execute a first set of one or more applications that are carried by a first service after downloading the first set of one or more applications, and
wherein, upon receiving from the user an instruction to change from the first service to a second service, the decoder is configured to determine which of the first set of applications is also carried by the second service, wherein the determination is made based on the information in the application data table without obtaining a PMT table for the second service; and
wherein, upon determining that at least one or more of the first set of applications is also carried by the second service, the decoder is configured to maintain or delete the one or more applications of the first set of applications that are also carried by the second service during the service change.

13. The transmission apparatus as claimed in claim 12, wherein the transmitter is adapted to transmit, for each of the plurality of services, a program map table providing a point of access to said at least one application carried by this service.

14. The transmission apparatus as claimed in claim 12, wherein the transmitter is adapted to transmit a plurality of said application data tables, each application data table containing information regarding applications contained within a bouquet of services.

15. A transmission apparatus as claimed in claim 12, wherein the digital transport stream conforms to the MPEG standard.

16. A decoder, comprising:
a memory for storing an application data table comprising information regarding applications carried by a plurality of services within a digital transport stream, wherein each of the plurality of services carries at least one application,
wherein the at least one application comprises an application executable by the decoder,
wherein the application data table further comprises a list of applications carried by each of the plurality of services and is configured to indicate whether a given application is carried by more than one service,
the decoder being configured to:
execute a first set of one or more applications that are carried by a first service after downloading the first set of one or more applications;
upon receiving from the user an instruction to change from the first service to a second service, determine which of the first set of applications is also carried by the second service, wherein the determination is made based on the information in the application data table without obtaining a PMT table for the second service; and
upon determining that at least one or more of the first set of applications is also carried by the second service, maintain or delete the one or more applications of the first set of applications that are also carried by the second service during the service change.

17. The decoder as claimed in claim 16, wherein said application data table further comprises information linking each application carried by said plurality of services to parameters describing each said application.

18. The decoder as claimed in claim 17, wherein said parameters comprise an application identifier uniquely identifying said each application within the plurality of services.

19. The decoder as claimed in claim 17, wherein said parameters comprise information defining whether an application is to be maintained or not when changing services.

20. The decoder as claimed in claim 17, wherein said parameters comprise information indicating whether an application is exclusive to a service.

21. The decoder as claimed in claim 17, wherein said parameters comprise a priority of an application for accessing resources of the decoder compared to other applications.

22. The decoder as claimed in claim 17, wherein said parameters comprise a priority of an application for downloading by the decoder.

23. A method of reception by a decoder of applications carried in a plurality of services, each application being carried by one or more of the plurality of services, wherein the said plurality of services is transmitted in a digital transport stream, said method comprising the steps of:
receiving an application data table containing information regarding said applications carried by said plurality of services,
wherein each application is an executable application configured to execute on said decoder, and wherein said application data table comprises a list of all applications carried by each of the plurality of services and indicates whether a given application is carried by more than one service;

executing on the decoder, a first set of one or more applications that are carried by a first service after downloading the first set of one or more applications;

upon receiving from the user an instruction to change from the first service to a second service, determining which of the first set of applications is also carried by the second service, wherein the determination is made based on the information in the application data table without obtaining a PMT table for the second service; and upon determining that at least one or more of the first set of applications is also carried by the second service, maintaining or deleting the one or more applications of the first set of applications that are also carried by the second service during the service change.

24. The method as claimed in claim 23, wherein said application data table further comprises information linking each application carried by said plurality of services to parameters describing each said application.

25. The method as claimed in claim 24, wherein said parameters comprise an application identifier uniquely identifying said each application within the plurality of services.

26. The method as claimed in claim 24, wherein said parameters comprise information defining whether an application is to be maintained or not when changing services.

27. The method as claimed in claim 24, wherein said parameters comprise a priority of an application for accessing resources of the decoder compared to other applications.

28. The method as claimed in claim 24, wherein said parameters comprise a priority of an application for downloading by the decoder.

29. The method as claimed in claim 23, wherein one or more of the first set of applications is deleted when the one or more applications includes a parameter exclusive to the first service in the application data table.

30. The method as claimed in claim 23, further comprising deleting the one or more of the first set of applications after a predetermined period of time, upon determining that the one or more of the first set of application is not carried by the second service.

* * * * *

UNITED STATES PATENT AND TRADEMARK OFFICE
CERTIFICATE OF CORRECTION

PATENT NO. : 8,359,626 B1
APPLICATION NO. : 09/786778
DATED : January 22, 2013
INVENTOR(S) : Francois Rey et al.

It is certified that error appears in the above-identified patent and that said Letters Patent is hereby corrected as shown below:

In the Claims:

At column 18, claim 1, line 40-41, the phrase "carried by one or more of the plurality of, comprising" should read -- carried by one or more of the plurality of <u>services, said method</u> comprising --.

Signed and Sealed this
Fourteenth Day of May, 2013

Teresa Stanek Rea
*Acting Director of the United States Patent and Trademark Office*